INVENTORS
THEODORE M. GILLEN
ALBERT O. DAHL

BY

ATTORNEYS

United States Patent Office 3,566,542
Patented Mar. 2, 1971

3,566,542
WINDOW ASSEMBLY
Theodore M. Gillen, Stillwater, and Albert O. Dahl, Bayport, Minn., assignors to Andersen Corporation, Bayport, Minn.
Filed Apr. 2, 1969, Ser. No. 822,795
Int. Cl. E06b 7/16
U.S. Cl. 49—504     11 Claims

ABSTRACT OF THE DISCLOSURE

A window assembly having deformable means for aligning and supporting a window having an inclined marginal edge.

BACKGROUND OF THE INVENTION

Field of the invention

This invention relates generally to window assemblies and, more specifically, to frames for supporting and aligning a glass having an inclined marginal edge.

Description of the prior art

Typically, prior art window frames have a groove or U-shaped slot for receiving and supporting the glass. The glass is inserted into the grooves in the unassembled frame and the frame is then assembled around the glass. Next, the glass is aligned and glazed into the frame so as to provide a waterproof seal between the glass and the frame. The glass is usually glazed from the inside face and the outside face to ensure a good moisture seal around the glass. During transportation of these sealed units from the factory to the supplier and consequently to the job, the glass often undergoes temperature changes and vibrations which cause the glass to expand and move in the frame thus producing a pumping action on the glazing compound between the frame and the glass. This pumping action forces the glazing compound out from between the glass and the frame. Obviously, this is undesirable as it increases the opportunity for moisture to seep between the glass and the frame as well as producing an unsightly appearance to the assembled unit. This problem is particularly acute with the welded edge insulated windows that comprise two separate layers of glass with an insulation layer of air located therebetween. The general configuration or appearance of the marginal edge of these welded edge insulated windows is of an inclined ramp. Typically, these windows are welded together at the marginal edge in a pattern which produces either a U-shaped or V-shaped type of appearance.

The present invention eliminates the problem of the pumping of the glazing compound through the use of a pair of deformable or crushable wedge-shaped support members that extend along the bottom of the groove in the frame. In addition, the deformable members are made from a material similar to the frame so that in addition to holding the glass in a supporting relationship, they also guide the inclined marginal edge of the glass into a predetermined alignment with respect to the inside face of the window frame. Because of this mating and guiding engagement of the marginal edge of the glass and the support members, it allows an operator to rapidly align the glass in the window frame. Typically, as the operator assembles the unit, the tips of the deformable means crush or break to conform to the size of the glass thus providing vertical and horizontal support for the glass within the frame. In addition, the inclined marginal edge of the glass also slides over the top edges of the support members as the frame members are moved inward to the assembled position. This pushes the glass against the inside face of the frame thus bringing the glass into the position of preferred alignment.

SUMMARY OF THE INVENTION

Briefly, the invention comprises a frame having a pair of deformable crushable members located along the bottom portion of the window receiving grooves to horizontally and vertically support the glass. The members also slidably engage the inclined marginal edge of the glass thereby bringing the glass into proximity of the inside face of the frame as the frame is assembled around the glass.

DESCRIPTION OF THE PREFERRED EMBODIMENT

Figure 1:
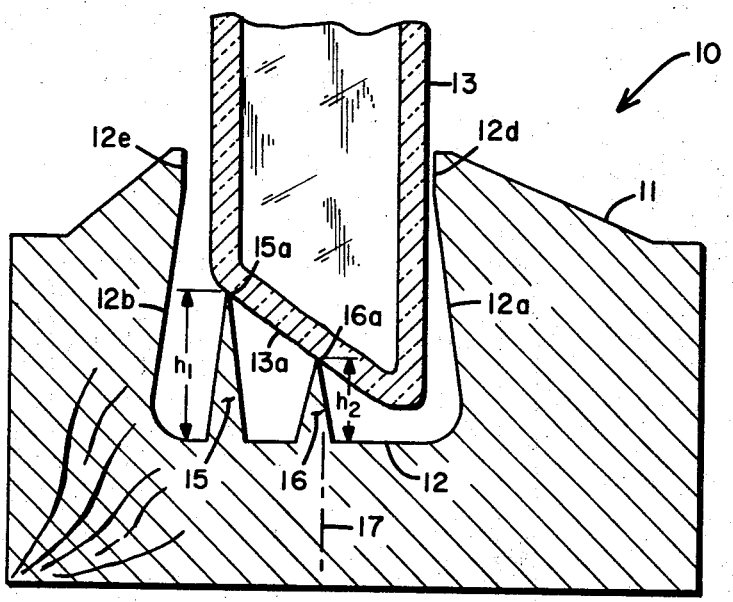
FIG. 1 is a cross-sectional view of a frame member and a glass prior to assembly of the glass in the frame.

Referring to FIG. 1, reference numeral 10 generally designates a window assembly unit comprising a frame 11 having a contoured groove 12 for receiving an insulated glass member 13 having an inclined marginal edge 13a. Contoured groove 12 has a larger bottom width than top opening to provide a keying action between the glazing compound and the groove. Groove 12 has a first upwardly projecting wedge-shaped member 15 having a feather edge 15a and a second upwardly projecting wedge-shaped member 16 having a feather edge 16a. Members 15 and 16 extend longitudinally along frame 11 in a parallel, spaced relationship within groove 12. Member 15 is located toward the outside face of frame 11 (to the left of centerline 17) and member 16 is located substantially on the left of centerline 17. Member 15 projects upward from the bottom of groove 12 a distance denoted by $h_1$ and member 16 similarly projects upward from the bottom of groove 12 a distance denoted by $h_2$. Although $h_1$ and $h_2$ may vary in height, it is a characteristic feature that $h_1$ is greater than $h_2$ so that a plane passing across the top of members 15 and 16 is at an inclined angle to the bottom of groove 12. Typically, $h_1$ may be $7/32''$ and $h_2$ may be $1/8''$ with a groove having an opening of $3/4''$, however, these dimensions are merely given for illustrative purposes and no limitation is intended thereto.

Although two deformable members are shown in groove 12, it is apparent that one deformable member could also be used to support and align the glass. However, two are preferred as they produce a larger support area and still provide the flexibility to conform to the glass.

If frame member 11 is made from wood, upwardly projecting members 15 and 16 can also be made from wood by milling the members into frame 11 at the same time groove 12 is milled in frame 11.

The purpose of providing wedge-shaped members 15 and 16 having a feather edge is to allow the tops of members 15 and 16 to crush and break as glass 13 is forced against members 15 and 16. If a glass having an inclined marginal edge is forced against members 15 and 16, the difference in height between the two members 15 and 16 is such that the inclined marginal edge slidably and crushably engages the tops of the deformable members 15 and 16 as it slides into an abutting relationship with throat 12d in groove 12. This securely holds and aligns the glass in a fixed position against inside frame 12d.

Figure 2:
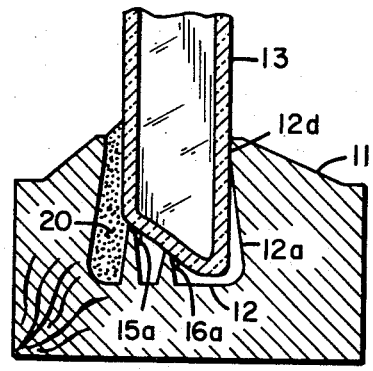
FIG. 2 is a cross-sectional view of the assembled frame and glass.

FIG. 2 shows a cross-sectional assembled view of glass 13 and members 15 and 16. In the assembled condition the tips or feather edges 15a and 16 are broken off or have been crushed by glass 13. Located between the outside of glass 13 and throat section 12e is a glazing compound 20. Glazing compound 20 cushions glass 13 in frame 11 as well as provides a moisture proof seal between the glass and the frame. While some glazing compound may flow past members 15 and 16 and to the inside face of glass 13, for the most part members 15 and 16 act as a baffle to prevent glazing compound 20 from flowing around the glass and past the inside of frame 11. By preventing glazing compound 20 from squeezing completely around glass 13 and out on the inside face of glass 13, it eliminates the extra step of back glazing the inside of the unit. Thus, the unit can be assembled and glazing compound 20 can be inserted without being concerned about the necessity of back glazing the inside due to glazing compound squeezing between the inside of frame 12d and glass 13.

Figure 3:
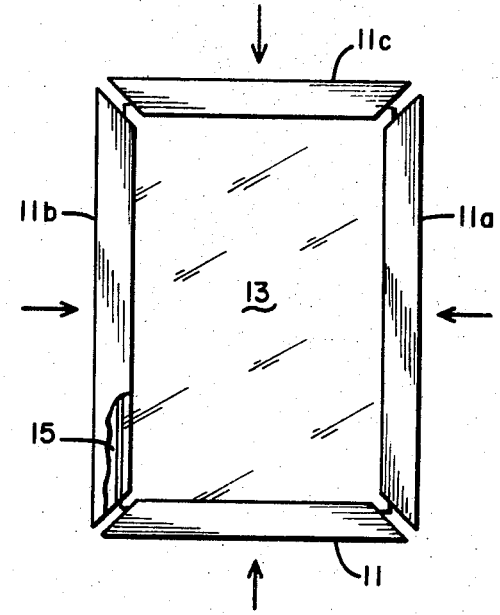
FIG. 3 is a front elevation view of the frame members and the glass prior to forcing the frame members around the glass.

FIG. 3 shows a window assembly comprising a bottom frame member 11, a side frame member 11a, a side frame member 11b and a top frame member 11c. Members 11b, 11c and 11e are identical to previously described member 11 in that they have a contoured groove 12 and a pair of deformable members located therein which are coextensive with the previous frame members. In assembly the unit members 11, 11a, 11b and 11e are forced inward until the ends of the adjacent frame members are in an abutting relationship which also forces glass 13 to align with the inside face of frame 11 as shown in FIG. 2. Next, the frame members are fastened together to provide a continuous frame for supporting the inclined marginal edge of glass 13.

Although the frame members have been shown as made from wood, it is apparent that plastic or vinyl covered frame members could also be used. In the event that a vinyl clad frame was used, deformable members 15 and 16 could be extruded from a deformable material or manufactured separately and inserted into the bottom of the groove.

We claim:
1. A window assembly suitable for supporting and aligning a member having an inclined marginal edge comprising: a member having an inclined marginal edge; a frame, said frame having a continuous contoured groove located therein, said groove having a bottom section suitable for receiving said member having an inclined marginal edge; and deformable aligning means located on the bottom of said groove so that when said member having an inclined marginal edge is placed in said groove, said deformable aligning means deforms to support the edge of the member and forces said member into alignment in said groove.

2. The invention as described in claim 1 wherein said deformable aligning means includes at least a pair of members having a predetermined height located in a spaced parallel relationship.

3. The invention as described in claim 2 wherein said pair of deformable aligning members are of unequal height so as to produce mating sliding alignment with the inclined marginal edge on said member.

4. The invention as described in claim 3, wherein said pair of deformable aligning members are wedge-shaped.

5. The invention as described in claim 3 wherein said member comprises a pair of glass members having a seamless welded edge.

6. The invention as described in claim 3 wherein said pair of deformable members extend longitudinally along said frame.

7. The invention as described in claim 6 wherein said frame comprises a closed frame having said contoured groove located coextensive therewith.

8. The invention as described in claim 6 wherein said frame comprises a closed wood frame and said pair of deformable aligning members are integrally formed in said wood frame.

9. The invention as described in claim 6 wherein said deformable aligning members are located substantially on one side of the geometric center of said groove.

10. The method of making a frame for a glass member having an inclined marginal edge comprising the steps of:
 (a) forming a substantially closed frame;
 (b) cutting a contoured groove having an inside face, an outside face and a pair of upwardly projecting members;
 (c) placing a seamless welded edge glass having an inclined marginal edge in said contour groove; and
 (d) forcing said frame against said pair of upwardly projecting members to thereby force one side of glass against the first face of the contoured groove.

11. The method as described in claim 10 including the step of applying a sealant between the second face of the contoured groove and the opposite side of said glass.

References Cited
UNITED STATES PATENTS

| | | | |
|---|---|---|---|
| 2,698,975 | 1/1955 | Sharp | 52—616X |
| 2,772,915 | 12/1956 | Renno | 52—400X |
| 3,171,886 | 3/1965 | Holt et al. | 52—400X |

J. KARL BELL, Primary Examiner

U.S. Cl. X.R.

49—484; 52—304, 400, 627